United States Patent
Jones et al.

(10) Patent No.: US 12,056,621 B2
(45) Date of Patent: Aug. 6, 2024

(54) METHOD AND SYSTEM FOR PREDICTING AND PREEMPTING PATCHING FAILURES

(71) Applicant: JPMorgan Chase Bank, N.A., New York, NY (US)

(72) Inventors: Andrew E. Jones, Dublin, OH (US); Joseph M. Schilling, Columbus, OH (US); Raghavendra Reddy Muttana, Lake Hiawatha, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 276 days.

(21) Appl. No.: 16/579,001

(22) Filed: Sep. 23, 2019

(65) Prior Publication Data

US 2020/0097842 A1 Mar. 26, 2020

Related U.S. Application Data (60) Provisional application No. 62/734,469, filed on Sep. 21, 2018.

(51) Int. Cl.
| | |
|---|---|
| G06N 5/04 | (2023.01) |
| G06F 8/65 | (2018.01) |
| G06N 5/01 | (2023.01) |
| G06N 20/00 | (2019.01) |

(52) U.S. Cl.
CPC ............ *G06N 5/04* (2013.01); *G06N 5/01* (2023.01); *G06N 20/00* (2019.01); *G06F 8/65* (2013.01)

(58) Field of Classification Search
CPC .......... G06N 5/04; G06N 20/00; G06N 20/10; G06N 20/20; G06N 5/003; G06F 8/65
See application file for complete search history.

(56) References Cited

U.S. PATENT DOCUMENTS

| | | | |
|---|---|---|---|
| 8,001,527 B1* | 8/2011 | Qureshi | G06N 5/048 |
| | | | 717/120 |
| 9,063,818 B1* | 6/2015 | Risbood | G06N 20/00 |
| 2004/0064726 A1* | 4/2004 | Girouard | G06F 21/577 |
| | | | 726/25 |

(Continued)

FOREIGN PATENT DOCUMENTS

JP 2001350988 A * 12/2001

OTHER PUBLICATIONS

Feuz et al., Ranking and automatic selection of machine learning models, published Dec. 13, 2017, Technical Disclosure Commons, Defensive Publications Series (http://www.tdcommons.org/dpubs_series/982), 34 pages (Year: 2017).*

(Continued)

*Primary Examiner* — Li B. Zhen
*Assistant Examiner* — William Wai Yin Kwan
(74) *Attorney, Agent, or Firm* — GREENBLUM & BERNSTEIN, P.L.C.

(57) ABSTRACT

An embodiment of the present invention is directed to evaluating and identifying optimal features to address and improve automation patching success. An embodiment of the present invention compares machine leaning algorithms and their accuracy in predicting the outcome of upcoming scheduled maintenance activities. Understanding that predicted outcome and the path that is generated to reach that outcome, the features that predispose an asset into a failure state can be addressed preemptively.

8 Claims, 4 Drawing Sheets

(56) References Cited

U.S. PATENT DOCUMENTS

| | | | | |
|---|---|---|---|---|
| 2008/0250265 | A1* | 10/2008 | Chang | G06F 11/0751 |
| | | | | 714/4.12 |
| 2016/0343004 | A1* | 11/2016 | Brink | G06Q 30/0201 |
| 2016/0350671 | A1* | 12/2016 | Morris, II | G06N 20/00 |
| 2019/0129705 | A1* | 5/2019 | Bulut | G06F 21/577 |

OTHER PUBLICATIONS

Wakefield, Katrina, A Guide to Machine Learning Algorithms and their Applications, SAS UK, first published Mar. 6, 2018, retrieved from web.archive.org (https://web.archive.org/web/20180306053604/https://www.sas.com/en_gb/insights/articles/analytics/machine-learning-algorithms.html), 4 pages (Year: 2018).*

Michie et al., Machine Learning, Neural and Statistical Classification, Feb. 17, 1994, 298 pages (Year: 1994).*

* cited by examiner

METHOD AND SYSTEM FOR PREDICTING AND PREEMPTING PATCHING FAILURES

CROSS REFERENCE TO RELATED APPLICATIONS

The application claims priority to U.S. Provisional Application 62/734,469, filed Sep. 21, 2018, the contents of which are incorporated herein in its entirety.

FIELD OF THE INVENTION

The invention relates generally to a system and method that predict and preempt patching and other automation failures.

BACKGROUND OF THE INVENTION

Patching automation success leaves a subset of hosts that require manual investigation and remediation. These hosts, which average 500 plus servers per week, involve manual login and human intervention to bring required security update to each host that fails within automation or is unable to report a success. The current process is labor intensive, inefficient and time consuming.

These and other drawbacks exist.

SUMMARY OF THE INVENTION

According to one embodiment, the invention relates to a system for predicting and preempting software patching failures. The system comprises: a memory component that stores server data and historical data; an interactive interface that communicates with a user via a network communication; and a computer processor array coupled to the memory component and the interactive interface, the computer processor array configured to perform the steps of: accessing historical patching data from prior success and failure processes; identifying a set of features relating to a patching automation process based on the historical patching data; identifying and executing a plurality of prediction algorithms based on the set of features to generate a model that predicts whether an automation process will succeed or failure; comparing the plurality of prediction algorithms to identify an algorithm based on an accuracy metric; identifying an upcoming patching event; predicting an outcome of the upcoming patching event based on the algorithm; identifying a path for the predicted outcome that predispose into a failure state; and identifying one or more corrective actions specific to the upcoming patching event.

According to one embodiment, the invention relates to a method for predicting and preempting software patching failures. The method comprises the steps of: accessing, via a memory interface, historical patching data from prior success and failure processes; identifying, via a computer processor, a set of features relating to a patching automation process based on the historical patching data; identifying and executing, via the computer processor, a plurality of prediction algorithms to generate a model that predicts whether an automation process will succeed or failure; comparing, via the computer processor, the plurality of prediction algorithms to identify an algorithm based on an accuracy metric; identifying, via the computer processor, an upcoming patching event; predicting, via the computer processor, an outcome of the upcoming patching event based on the algorithm; identifying, via the computer processor, a path for the predicted outcome that predispose into a failure state; and identifying, via the computer processor, one or more corrective actions specific to the upcoming patching event.

The computer implemented system and method described herein provide unique advantages to entities, organizations and other users, according to various embodiments of the invention. An embodiment of the present invention is directed to enhancing automation by predicting and preempting patching and other automation failures. The innovative system and method provides new insights in determining underlying trends and patterns and further provides suggestions and/or corrections to achieve consistency. Accordingly, a system and method of an embodiment of the present invention provides improved utilization, resource efficiencies and substantial cost savings. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to evaluating and identifying optimal features to address and improve automation patching success. An embodiment of the present invention may compare machine leaning algorithms and their accuracy in predicting the outcome of upcoming scheduled maintenance activities. By understanding that predicted outcome and the path that is generated to reach that outcome, an embodiment of the present invention identifies features that predispose an asset into a failure state. The features may then be used to preemptively address patching and other failures. The path may be represented as a decision tree or other graphic.

An embodiment of the present invention is directed to enhancing automation to become hands-free while minimizing defects in the process. This further achieves compatibility with patching solutions and other automation processes. The innovative system and method address patching automation issues with machine learning and productivity analysis. By determining underlying trends and patterns, an embodiment of the present invention provides insights and corrective actions that preemptively address patching and other issues.

A patching program may involve automatically patching infrastructure servers during a periodic schedule (e.g., each month, etc.). The patching program may apply an automation solution to a set of infrastructure servers. This may involve hundreds or thousands of servers. The patching program may apply software updates and core application upgrades. For example, an entity may apply a new version of an antivirus tool. An embodiment of the present invention may be directed to addressing and/or reducing incidents (e.g., automation incompatibilities, framework and/or infrastructure issues, etc.) to servers and other assets. With most patching programs, there is a residual amount of servers that are incompatible with the automation. Over a period of time, the number of incompatible servers will increase and become difficult to manage and address thereby resulting in a labor intensive and time consuming manual process. An embodiment of the present invention applies a learning algorithm to determine a predictable pattern based on historical data (e.g., previous month, etc.) to address residual servers. The learning algorithm may also consider data features relevant to the patching program (or other applications). The pattern may then be used to train a learning model to address a patching problem and automatically address the residual servers. As recognized by an embodiment of the present invention, the residual amount of servers may be the result of incompatibilities, including server infrastructure, application configuration, firewall rules, policies and/or other factors.

Figure 1:
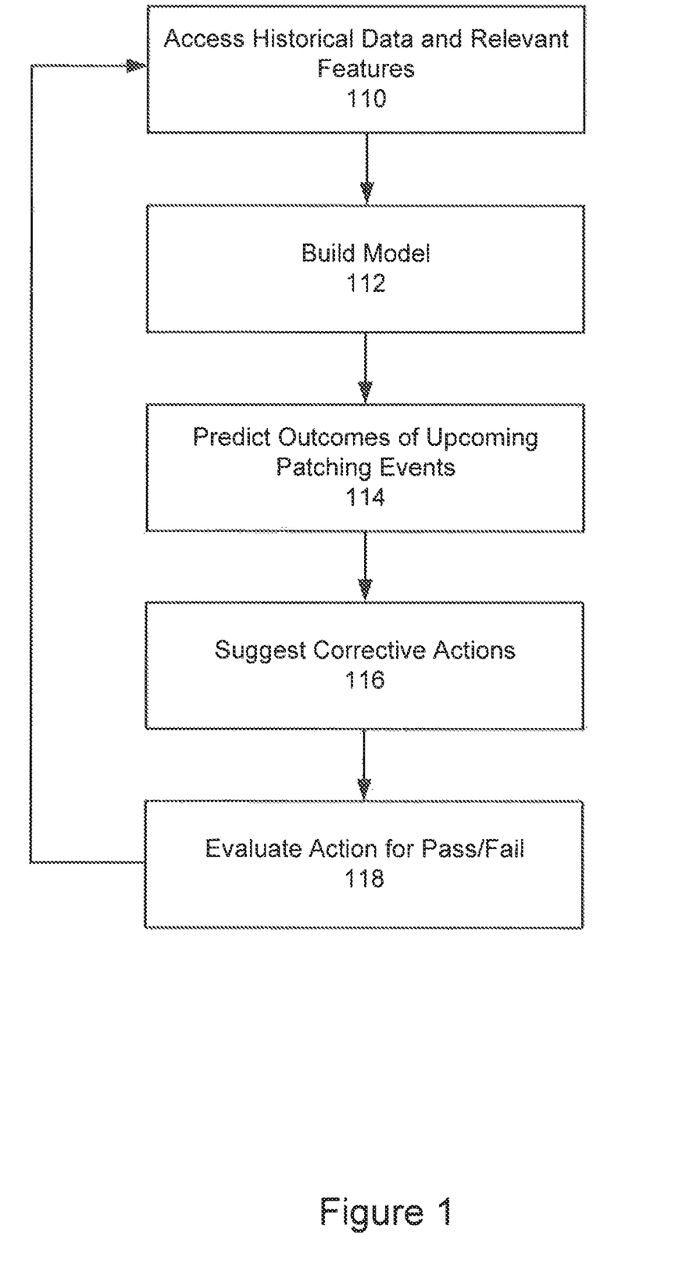
FIG. 1 is an exemplary flowchart for predicting and preempting software patching failures, according to an embodiment of the present invention.

FIG. 1 is an exemplary flowchart for predicting and preempting software patching failures, according to an embodiment of the present invention. An embodiment of the present invention is not constrained to patching automation, any incompatibility with automation is a candidate to understanding trends and how to become predictably successful. For example, an embodiment of the present invention may be applied to determine what is causing a server to have more tickets (e.g., failures, issues, etc.) than others.

Figure 2:
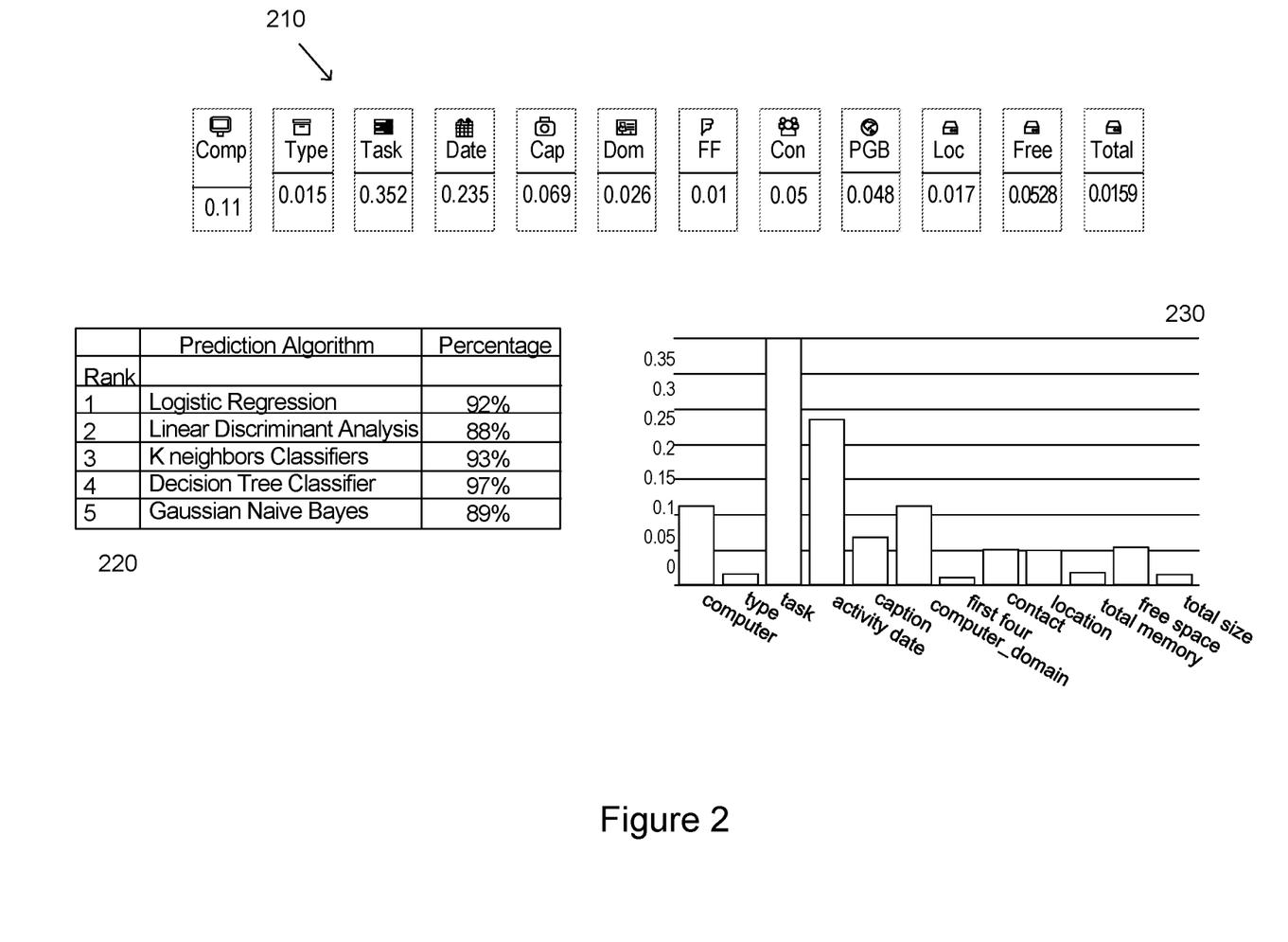
FIG. 2 is an exemplary interactive interface that illustrates feature identification, according to an embodiment of the present invention.

As shown in FIG. 1, historical data and relevant features may be gathered, at step 110. Machine learning model may be built and evaluated, at step 112. Outcomes of upcoming patching events may be predicted, at step 114. Corrective actions may be suggested, at step 116. The system may also evaluate action for pass or fail, at step 118. Other variations may be applied. While the process of FIG. 2 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

At step 110, historical data and relevant features may be gathered. An embodiment of the present invention is directed to generating a machine learning model from patch success and/or failure data as well as other patching history data. Features may be identified as contributing factors for patching success and/or failure. For example, features may include system specifications (e.g., memory capacity, free space availability, etc.), environment (e.g., data center, owning team, etc.), task related features (e.g., type of task, activity date, etc.) as well as other considerations. As the system makes predictions, that data may be used to further iterate and train the model.

At step 112, a machine learning model may be built and evaluated. Prediction algorithms may be identified and applied to the features. Periodically rebuilding and reevaluating a model prevents making decisions on outdated data. For example, prediction algorithm success may be compared to identify an optimal prediction algorithm.

At step 114, outcomes of upcoming patching events may be predicted. For example, predictions may be executed when servers are scheduled for patching events, e.g., monthly, weekly, etc. An embodiment of the present invention may be directed to identifying trends and patterns. This may involve applying iterations to identify an optimal amount of features and/or properties to address an automation problem. An embodiment of the present invention may consider various factors and features, including server environment, type of automation process or task (e.g., patching, reboot, software update, firmware update, etc.), operation system version, host domain, physical specifications (e.g., memory, free space, type of server, data center, etc.), datacenter, owning team and/or other data. For example, a server configuration may be specific to a particular owning team, e.g., application team. In this example, the application team's server configuration may be influential in determine whether an automation is successful or not. According to another example, the task itself (e.g., whether the task is a new task or not) may provide a strong indication of success or failure, According to an embodiment of the present invention, a prediction may be initiated on a model via an API. The model may be saved locally and then loaded in memory so that a prediction may be made on a new set of data. An embodiment of the present invention may predict whether an automation process will succeed or fail based on a classification. A decision tree graphic (or other representation) may be analyzed to then identify factors contributing to a success or failure. For example, an embodiment of the present invention may identify and analyze a path that leads to an automation failure. By correcting and/or addressing contributing factors, automation failure may be avoided. For example, an embodiment of the present invention may identify a lack of free space as a contributing factor for failure. In this scenario, files may be identified for deletion or other corrective action may be identified and executed. According to another example, memory utilization may be identified where a corrective action may involve resizing the underlying memory structure. An embodiment of the present invention may further identify whether the contributing features are easily fixable, e.g., changeable. For example, memory allocation and free space may be addressed with relative minor disruptions and effort. In contrast, it may be substantially more difficult to change a data center designation.

At step 116, corrective actions may be suggested. An embodiment of the present invention may preemptively address a failure state. This step may occur after step 118 below. Other variations may be applied. An embodiment of the present invention may identify that a particular hardware platform is inconsistent with automated patching. For example, an embodiment of the present invention may recognize that a particular team (or other subset of servers) has a substantially lower rate of automation success (as compared to the overall success) and further drill down and identify factors and/or features that may be a root cause or contributing factor, e.g., a particular configuration.

At step 118, actions may be evaluated for pass or fail determinations. At this step, a path for a predicted outcome may be identified. Features that predispose into a failure state may be identified. Feature selection is important to capture new influencing factors into a predictable outcome. According to an embodiment of the present invention, a decision tree graphic may include various paths that provide insights to automation success or failure. For example, the decision tree graphic may indicate whether an amount of free space below a threshold impacted or caused an automation failure. An embodiment of the present invention may then provide a correction action (per step 116) that requests or provides an extra X amount of memory.

FIG. 2 is an exemplary interactive interface that illustrates feature identification, according to an embodiment of the present invention. In this example, various weights may be shown for each factor at 210. Section 220 provides a ranking for a set of Prediction Algorithms with a corresponding percentage. The percentage may represent a measure of accuracy. Section 230 provides a graphical illustration of various factors and corresponding weights. For example, corresponding weights may indicate how often the corresponding feature was used in determining whether an automation is successful or a failure. Other information and illustrations may be provided.

Factors 210 may include computer name; type; task; activity date; caption; computer domain; first four; contact group location; PGB (physical memory in GB); location; free space; total physical memory (in GB) may represent total size of disk; etc. For example, first four may represent the first four letters of a computer name. The same first four letters may indicate that a group of devices have a common feature, e.g., built under a same or similar standard.

According to an embodiment of the present invention, results may be obtained by integration of this process into an evaluation of upcoming schedules and forecasting outcomes for awareness and manual intervention to correct deficiency with automation offering. An embodiment of the present invention is further directed to categorizing conditions that are causing failures to prioritize various fix actions for problematic hosts. Accordingly, automation may be applied to achieve a bands-free and dependable state.

The factors shown in FIG. 2 may be specific to a particular task, as the task itself may be considered influential in the automation process. As shown in 230, task and activity date have a higher influence on the prediction accuracy.

Through various measurements and historical data patterns, an embodiment of the present invention may identify and apply a best model to identify optimal patterns within the data and apply a feature selection process. Further, an embodiment of the present invention may be directed to recommending optimal features.

The exemplary decision tree may be generated by a machine learning model. In addition, an embodiment of the present invention may apply various iterations to the data prior to identifying an optimal data model. This may be performed by running queries (e.g., SQL queries).

Figure 3:
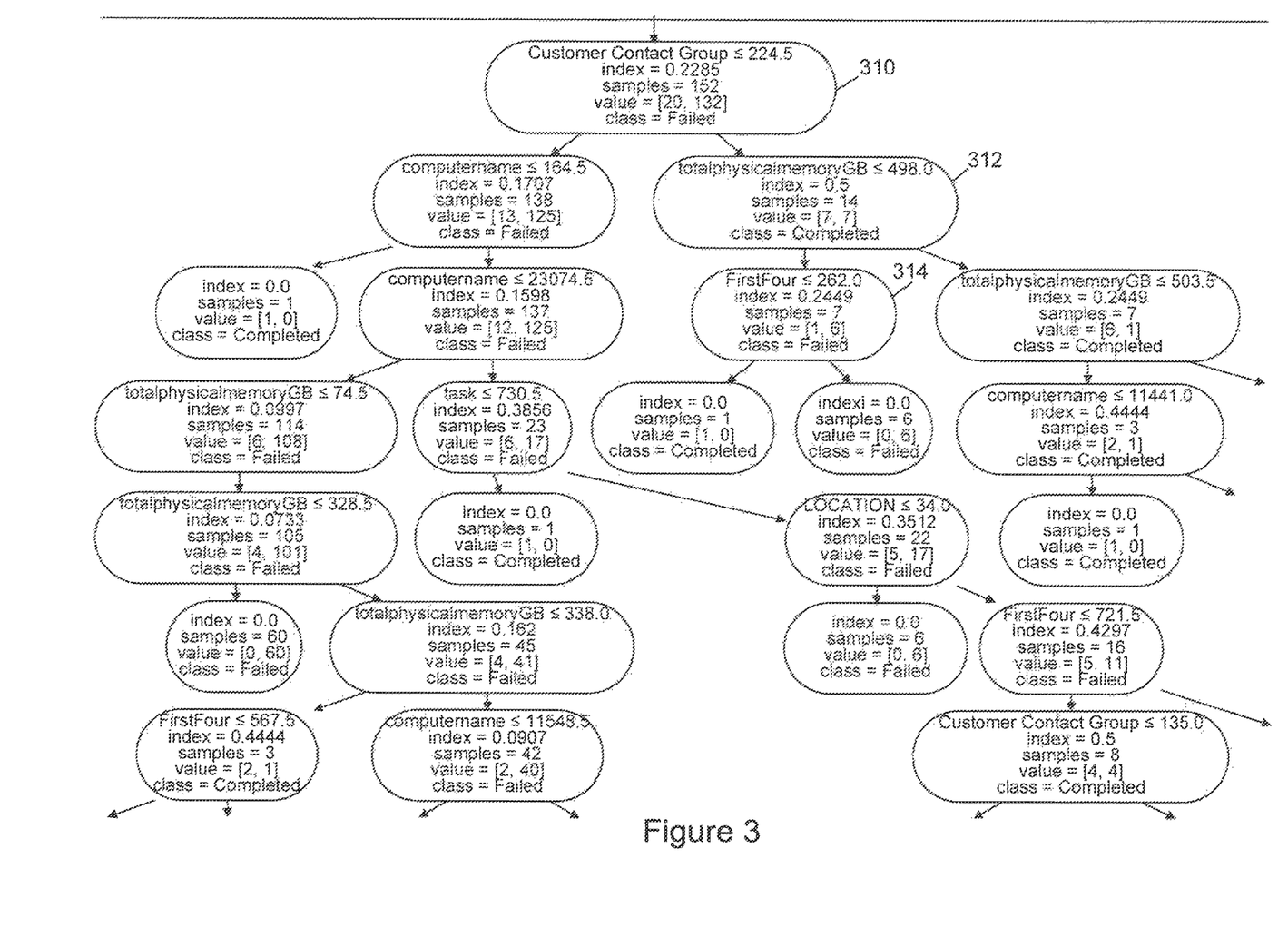
FIG. 3 is an exemplary decision tree graphic, according to an embodiment of the present invention.

FIG. 3 is an exemplary decision tree graphic, according to an embodiment of the present invention. The exemplary decision tree illustrates various classification paths. According to an embodiment of the present invention, a decision tree may represent a hierarchical data structure of possible outcomes of a series of related choices. A decision tree typically starts with a single node, which branches into possible outcomes, each of which in turn may lead to additional nodes recursively until a class label or value has been reached. Once setup, decision tree model may act like a protocol in a series of conditions that produce a specific result from the input data. For example, the decision tree may consider location, computer name, customer contact group, task, type, state, activity state and/or other factors.

As shown in FIG. 3, each cell may represent a feature with a corresponding set of data, e.g., index, samples, value and class. Index represents a measurement of degree/probability of a particular variable being wrongly classified when it is randomly chosen. It may range from 0 to 1, with 0 being an absolute value (pass or failed) and higher numbers being attributed with many values (e.g., of x possible locations, the degrees of how it could make an incorrect prediction based on that attribute). Other ranges may be applied. Samples may refer to an amount of records in a dataset that correspond to that level (e.g., Samples=6 where class is Failed means that 6 records fall into the same situation of why they are failing). Value represents an array that indicates the samples on that part of the model which falls into each category. Class may represent failed or completed. As shown in FIG. 3, a path may include a Customer Contact Group 310, a Total Physical Memory 312 and the First Four letters of a computer name 314 having a certain value. The first four letters of a computer name may indicate a group of application servers that were built under a same or similar standard. This may indicate that those computers have a particular configuration may be causing an automation failure.

Figure 4:
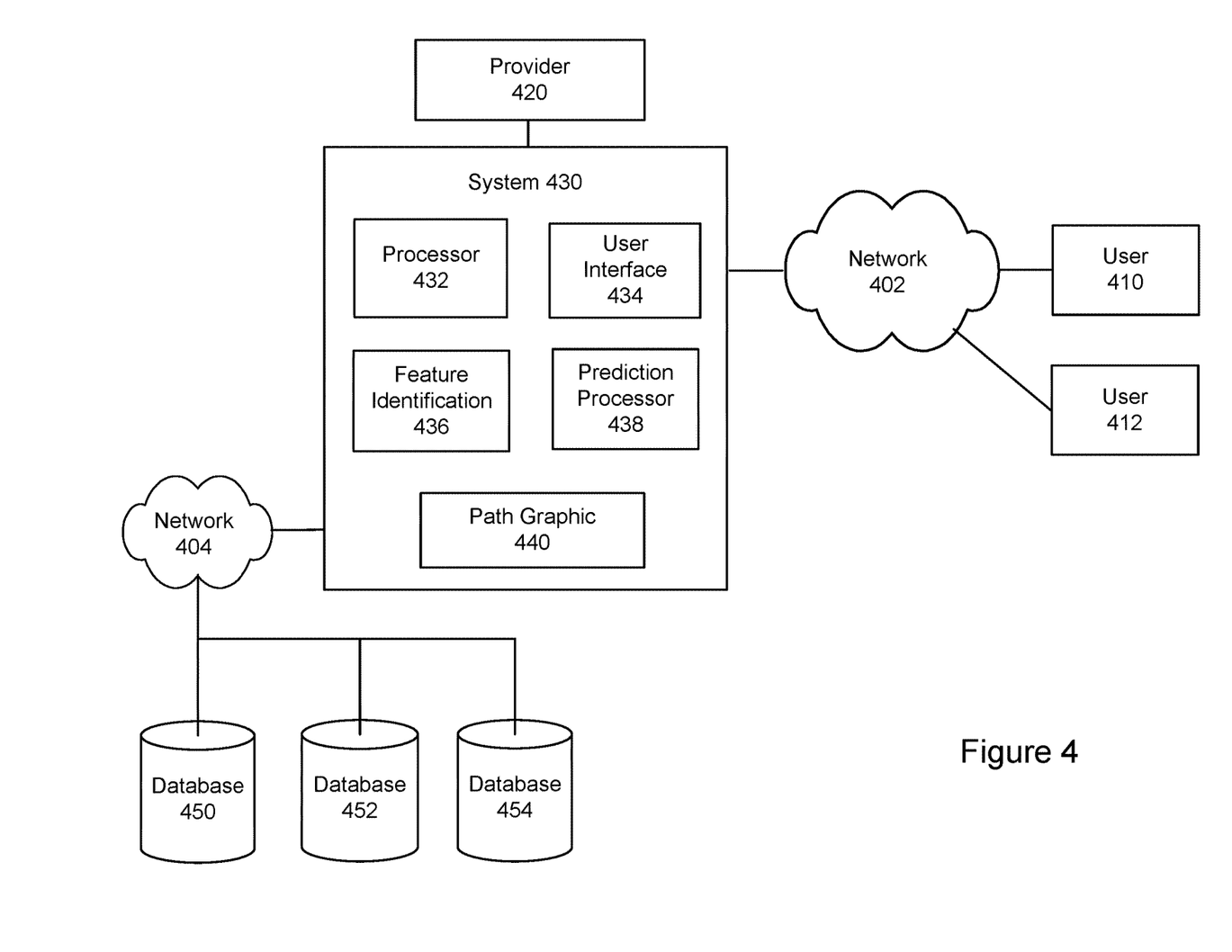
FIG. 4 is an exemplary system for predicting and preempting software patching failures, according to an embodiment of the present invention.

FIG. 4 is an exemplary system for predicting and pre-empting software patching failures, according to an embodiment of the present invention.

As shown in FIG. 4, System 430 includes processing components, modules and functions. According to an exemplary implementation, System 430 may include Processor 432, User Interface 434, Feature Identification 436, Prediction Processor 438. Path Graphic 440 and various networking and communication components. Other functions and services may be supported. The components illustrated in FIG. 4 are merely exemplary, other devices may be represented in various applications. While a single component is illustrated, each component may represent multiple components.

System 430 may be hosted by a financial institution or other entity. According to another example, System 430 may be supported by a third party service provider 420. Other scenarios and architectures may be implemented.

System 430 may store and access data from various database components, including Database 450, 452 and 454. For example, patching historical data may be stored and managed in Database 450. Other data may include feature data, decision tree data, etc.

Databases may be internal or external to System 430. Data may be stored and managed in storage components, represented by Database 450, via Network 404. System 430 may be communicatively coupled to Databases, represented by 450, 452, 454. Databases may include any suitable data structure to maintain the information and allow access and retrieval of the information. The storage may be local, remote, or a combination thereof with respect to Databases. Communications with Databases may be over a network, or communications may involve a direct connection between Databases and System 430, as depicted in FIG. 4. Databases may also represent cloud or other network based storage.

Network 402 may be communicatively coupled with various components in a network. Users 410, 412 may represent various types of users as well as other requesting entities. For example, Users 410, 412 may request data from System 430, via Network 402. System 430 may communicate with various users, represented by 410, 412, using any mobile or computing device, such as a laptop computer, a personal digital assistant, a smartphone, a smartwatch, smart glasses, other wearables or other computing devices capable of sending or receiving network signals.

The system 430 of FIG. 4 may be implemented in a variety of ways. Architecture within system 430 may be implemented as hardware components (e.g., module) within one or more network elements. It should also be appreciated that architecture within system 430 may be implemented in computer executable software (e.g., on a tangible, non-transitory computer readable medium) located within one or more network elements. Module functionality of architecture within system 430 may be located on a single device or distributed across a plurality of devices including one or more centralized servers and one or more mobile units or end user devices. The architecture depicted in system 430 is meant to be exemplary and non-limiting. For example, while connections and relationships between the elements of system 430 are depicted, it should be appreciated that other connections and relationships are possible. The system 430 described below may be used to implement the various methods herein, by way of example. Various elements of the system 430 may be referenced in explaining the exemplary methods described herein.

Network 402, 404 may be a wireless network, a wired network or any combination of wireless network and wired network. Although Network 402, 404 is depicted as one network for simplicity, it should be appreciated that according to one or more embodiments, Network 402, 404 may comprise a plurality of interconnected networks, such as, for example, a service provider network, the Internet, a cellular network, corporate networks, or even home networks, or any of the types of networks mentioned above. Data may be transmitted and received via Network 402, 404 utilizing a standard networking protocol or a standard telecommunications protocol.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor. As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, e.g., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, e.g., the software, that enables the computer operating system to perform the operations described above may be contained on any of a wide variety of media or medium, as desired. Further, the data that is processed by the set of instructions might also be contained on any of a wide variety of media or medium. That is, the particular medium, e.g., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, e.g., convey and receive information, with another processing machine, rather than a human user. Accordingly, the other processing machine might be characterized as a user. Further, it is contemplated that a user interface utilized in the system and method of the invention may interact partially with another processing a machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system for predicting and preempting software patching failures, the system comprising:
   a memory component that stores server data, a plurality of machine prediction algorithms and historical data;
   a computer processor array to execute a patching program for performing a patching automation process to a plurality of infrastructure servers according to a periodic schedule, and identifying at least one infrastructure server that is incompatible with the patching automation process;
an interactive interface that communicates with a user via a network communication; and
a machine learning model of the computer processor array coupled to the memory component and the interactive interface, wherein the machine learning model is periodically rebuilt based on new set of data, and the machine learning model is configured to perform:
accessing historical patching data from prior success and failure processes, including failure processes in the at least one infrastructure server that is incompatible with the patching automation process;
identifying a set of features relating to the patching automation process based on the historical patching data,
 wherein the set of features includes a plurality of factors that contributes to a failure or success of historical patching operations included in the historical patching data, and
 wherein the set of features include each of a memory capacity, free space availability, server environment, type of automation process or task, operation system version, host domain, and physical device specifications;
applying a weight to each of the plurality of factors, the weight applied indicating how often each of the plurality of factors was used in determining whether the historical patching operations were successful or not, wherein the plurality of factors include each of a computer name, a task, an activity date, a caption, a computer domain, a predetermined number of same characters included in the computer name, a contact group location, a total physical memory and a location;
generating, based on the set of features and weighted factors, a prediction for whether an automated patching process will succeed or fail for each of the plurality of machine prediction algorithms, wherein the plurality of machine prediction algorithms provide differing accuracy percentages for the prediction;
identifying an upcoming patching event;
selecting a machine prediction algorithm, for the upcoming patching event and among the plurality of machine prediction algorithms, based on the accuracy percentages of the plurality of machine prediction algorithms;
generating, a decision tree, via the machine learning model, based on the selected machine prediction algorithm, wherein the selected machine prediction algorithm is a decision tree algorithm, and wherein the decision tree comprises a plurality of classification paths and each classification path comprising a series of nodes, each node comprising a feature from the set of features;
predicting, in response to the upcoming patching event is scheduled to be executed and using the decision tree, an outcome of the upcoming patching event, the predicted outcome comprising analyzing attributes present in each of the classification paths of the decision tree and determining, among the plurality of classification paths, a likely decision tree classification path for the upcoming patching event;
determining whether the likely decision tree classification path predisposes into a failure state;
identifying attributes present in the likely decision tree classification path that contribute to the failure state;
identifying, upon determining the likely decision tree classification path predisposes into the failure state, one or more corrective actions specific to the upcoming patching event, the one or more corrective actions corresponding to the attributes present in the likely decision tree classification path that contribute to the failure state;
identifying, for each of the one or more corrective actions, corresponding amount of time to implement each of the one or more corrective actions;
providing the one or more corrective actions and the corresponding amount of time;
improving the machine learning model through training by iteration and accuracy determination of the predicted outcome;
based on the iteration, identifying optimal features to address an automation problem predicted in the at least one infrastructure server that is incompatible with the patching automation process, wherein the optimal features include increasing an amount of memory in the at least one infrastructure server; and
automatically performing the one or more corrective actions to implement at least one of the optimal features identified, wherein at least one of the one or more corrective actions increases the amount of memory in the at least one infrastructure server for avoiding the automation problem predicted in the at least one infrastructure server.

2. The system of claim 1, wherein the upcoming patching event comprises scheduled maintenance activity.

3. The system of claim 1, wherein each of the plurality of classification paths comprises a decision tree graphic.

4. The system of claim 1, wherein the predicting of the outcome of the upcoming patching event is based on a classification comprising success and failure.

5. A method for predicting and preempting software patching failures, the method comprising:
executing, via a computer processor array, a patching program for performing a patching automation process to a plurality of infrastructure servers according to a periodic schedule, and identifying at least one infrastructure server that is incompatible with the patching automation process;
performing operations using a machine learning model of a computer processor array, wherein the machine learning model is periodically rebuilt based on new set of data, the operations including:
accessing, via a memory interface, a plurality of machine prediction algorithms, and historical patching data from prior success and failure processes, including failure processes in the at least one infrastructure server that is incompatible with the patching automation process;
identifying a set of features relating to the patching automation process based on the historical patching data,
 wherein the set of features includes a plurality of factors that contributes to a failure or success of historical patching operations included in the historical patching data, and
 wherein the set of features include each of a memory capacity, free space availability, server environment, type of automation process or task, operation system version, host domain, and physical device specifications;
applying a weight to each of the plurality of factors, the weight applied indicating how often each of the plurality of factors was used in determining whether the historical patching operations were successful or not, wherein the plurality of factors include each of a computer name, a task, an activity date, a caption, a computer domain, a predetermined number of same characters included in the computer name, a contact group location, a total physical memory and a location;

generating, based on the set of features and weighted factors, a prediction for whether an automated patching process will succeed or fail for each of the plurality of machine prediction algorithms, wherein the plurality of machine prediction algorithms provide differing accuracy percentages for the prediction;

identifying an upcoming patching event;

selecting a machine prediction algorithm, for the upcoming patching event and among the plurality of machine prediction algorithms, based on the accuracy percentages of the plurality of machine prediction algorithms, generating, a decision tree, via the machine learning model, based on the selected machine prediction algorithm, wherein the selected machine prediction algorithm is a decision tree algorithm, and wherein the decision tree comprises a plurality of classification paths and each classification path comprising a series of nodes, each node comprising a feature from the set of features;

predicting, in response to the upcoming patching event scheduled to be executed and using the decision tree, an outcome of the upcoming patching event, the predicted outcome comprising analyzing attributes present in each of the classification paths of the decision tree and determining, among the plurality of classification paths, a likely decision tree classification path for the upcoming patching event;

determining whether the likely decision tree classification path predisposes into a failure state;

identifying attributes present in the likely decision tree classification path that contribute to the failure state;

identifying, via the machine learning model of the computer processor, upon determining the likely decision tree classification path predisposes into the failure state, one or more corrective actions specific to the upcoming patching event, the one or more corrective actions corresponding to the attributes present in the likely decision tree classification path that contribute to the failure state;

identifying, for each of the one or more corrective actions, corresponding amount of time to implement each of the one or more corrective actions;

providing the one or more corrective actions and the corresponding amount of time;

improving, via the computer processor, the machine learning model through training by iteration and accuracy determination of the predicted outcome;

based on the iteration, identifying optimal features to address an automation problem predicted in the at least one infrastructure server that is incompatible with the patching automation process, wherein the optimal features include increasing an amount of memory in the at least one infrastructure server; and automatically performing the one or more corrective actions to implement at least one of the optimal features identified, wherein at least one of the one or more corrective actions increases the amount of memory in the at least one infrastructure server for avoiding the automation problem predicted in the at least one infrastructure server.

6. The method of claim 5, wherein the upcoming patching event comprises scheduled maintenance activity.

7. The method of claim 5, wherein each of the plurality of classification paths comprises a decision tree graphic.

8. The method of claim 5, wherein the predicting of the outcome of the upcoming patching event is based on a classification comprising success and failure.

* * * * *